United States Patent [19]

Dykes et al.

[11] 4,119,022

[45] Oct. 10, 1978

[54] DISPENSING HEAD FOR IMPREGNATING MEAT WITH A LIQUID

[75] Inventors: Dewey B. Dykes, Birmingham; E. Michael Powers, Mountain Brook; T. Kenneth Foster, Birmingham; Robert E. Rogers, Mountain Brook, all of Ala.

[73] Assignee: The Jim Dandy Company, Birmingham, Ala.

[21] Appl. No.: 724,703

[22] Filed: Sep. 20, 1976

Related U.S. Application Data

[63] Continuation-in-part of Ser. No. 585,400, Jun. 9, 1975, Pat. No. 4,005,226.

[51] Int. Cl.² .............................................. A23L 3/34
[52] U.S. Cl. ................................ 99/532; 222/402.1; 222/564; 222/565
[58] Field of Search ............... 222/478, 488, 402.1, 222/402.13, 564, 565; 141/244, 245; 239/548, 562; 426/281, 332, 641; 401/28, 132, 134, 190; 251/320; 99/345, 532, 533; 128/173 H

[56] References Cited

U.S. PATENT DOCUMENTS

| 1,965,344 | 7/1934 | Josinsky | 401/28 |
| 2,670,673 | 3/1954 | Gordon et al. | 99/532 X |
| 2,802,604 | 8/1957 | Ebberts | 222/207 |
| 2,862,766 | 12/1958 | Ward | 239/562 |
| 3,168,059 | 2/1965 | Germann | 251/320 X |
| 3,661,072 | 5/1972 | Alliquant et al. | 99/532 |
| 3,744,678 | 7/1973 | Beres | 222/402.13 |
| 3,762,307 | 10/1973 | Bodovinac | 99/532 |

FOREIGN PATENT DOCUMENTS 1,117,365  5/1956  France ..................... 401/28

*Primary Examiner*—Stanley H. Tollberg
*Assistant Examiner*—David A. Scherbel

[57] ABSTRACT

A dispensing head having a plurality of prong-like nozzles is useful for impregnating meat with tenderizing and flavoring liquids. It may be fitted onto a pressure dispenser of the conventional type containing a bag to hold the liquid, a gas pressure space thereabout, and a reciprocable dispensing valve. The head so utilized has an inlet leading to a flushable chamber communicating to several prong-liked nozzles which project on parallel axes from a meat pressing surface, preferably having a rim. Pressing this surface so spreads the meat against the sides of the nozzles as to seal them against the escape of liquid dispensed under superatmospheric pressure, thus forcing it to impregnate the meat. The dispensing head is readily flushed; and provisions are made for remounting on the valve stem without discharging the contents of the container.

10 Claims, 5 Drawing Figures

DISPENSING HEAD FOR IMPREGNATING MEAT WITH A LIQUID

CROSS-REFERENCE TO RELATED APPLICATION

This application is a continuation-in-part of our co-pending patent application Ser. No. 585,400 filed June 9, 1975, entitled "Multiple Nozzle Dispenser Head", now allowed, as U.S. Pat. No. 4,005,226.

BACKGROUND OF THE INVENTION

This invention relates to dispensing heads, adapted for home use, for impregnating meat with tenderizer and flavoring liquids. To the best of the knowledge of applicants, this result has not been achieved heretofore; rather it is conventional to spread tenderizers and flavors on the surface which may first be pricked with a fork.

SUMMARY OF THE INVENTION

A principal object of the present invention is to provide a dispensing head for impregnating meat with liquid tenderizer or flavoring substances. Another object is to provide a dispensing head which is readily removed, flushed with water and replaced. Where the dispensing head is to be mounted on the valve of a pressurized dispensing container, a further object is to so construct it so that it may be re-mounted on the stem of the valve without inadvertently depressing the valve to discharge the liquid contents of the dispenser.

For achieving these purposes the dispensing head has a plurality of nozzles so spaced and shaped as to permit them to be pressed into a piece of uncooked meat and through them to inject and impregnate the meat with such pressurized liquid without the escape of any substantial amount of the liquid. An important feature of the present dispenser head is its top surface, so shaped and preferably rimmed that when pressure is exerted against the meat, the meat is so squeezed around the nozzles as to form a seal which prevents the escape of the pressurized liquid.

A flushable chamber is provided in the dispensing head, to distribute the liquid from a bottom inlet to the several nozzles. The chamber is circular, and sealed about its outer edge by sonic welding, to produce a sanitary joint. Where ribs are utilized to prevent deflection from closing off flow from into the chamber, these extend only a portion of the chamber height, and are disposed radially so as to offer the least obstacle to thorough flushing.

Since in this type of dispensing container the valve opens on being pressed downward, the problem was presented how to replace the dispensing head on the valve stem without inadvertently causing the valve to open to discharge part of the container contents. For this purpose, the inlet to the bore of the dispensing head has two resilient inward-projecting beads, the second being a sealing bead which is more constricting than the first bead. When the user wishes to re-mount the dispenser head after flushing it, the user pushes the dispensing head downward so the tip of the valve stem passes the first bead; this is accomplished without applying a downward force sufficient to overcome the pre-load on the valve spring. The tension in this bead is sufficient to permit the dispensing head to cling to the valve stem. The dispensing apparatus may then be inverted and the head pressed against the meat with sufficient force to push the valve stem past the second bead, sealing it and seating it firmly. This same pressure opens the dispensing valve and so presses the meat as to cause it to spread against and seal around the nozzles.

DESCRIPTION OF THE PREFERRED EMBODIMENT

Figure 1:
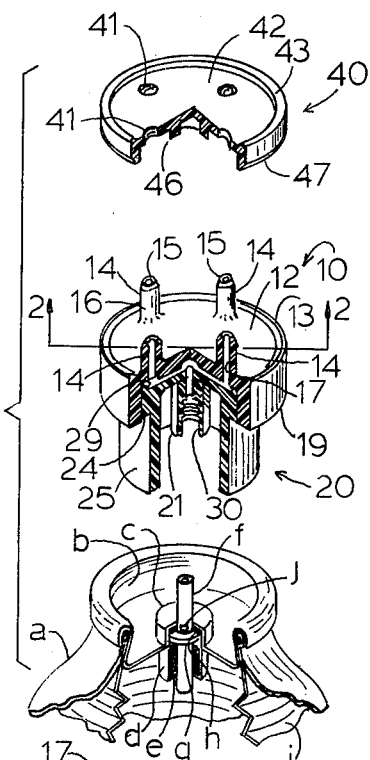
FIG. 1 is an exploded perspective view, partly in section, illustrating a preferred embodiment of the present invention as used with a conventional pressurized dispensing container shown fragmentarily.

The preferred embodiment of the present invention is designed for utilization with a conventional pressure dispenser shown as the lowermost part of FIG. 1. A pressure can designated $a$, which may be pressurized through an elastic grommet valve in its bottom (not shown) has its mouth sealed by a mounting cup $b$ within whose central dome $c$ is mounted a conventional reciprocable valve assembly $d$ having a preloaded compression closing spring $e$ which bears upward against a tubular outlet stem $f$. When the stem $f$ is pressed downward, a valve head $g$ is moved away from a sealing washer $h$. The valve $d$ is designed to empty the contents of a collapsible bag $i$ when squeezed by gas under pressure within the can $a$. Hence when the valve head $g$ is moved downward from the sealing washer $h$, the bag contents are discharged through a stem port $j$ into and through the outlet stem $f$.

In this embodiment, the dispensing head consists principally of an upper member generally designated 10 and a lower member generally designated 20; alternately a disk spacer generally designated 40 may be included. These are molded plastic parts, preferably circular in plan form.

Figure 2:
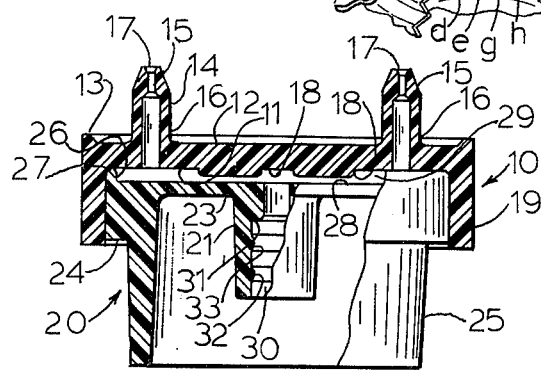
FIG. 2 is a somewhat enlarged view, principally in section, as seen along line 2—2 of FIG. 1.

For ease of understanding this embodiment, the lower member 20 will be described first. As shown in FIGS. 1 and 2, the lower member 20 has a central inlet hub 21 with an axial bore 22 which fits onto the tubular stem $f$ of the valve assembly $d$. The inlet hub 21 leads up to a slender circular body portion 23 which terminates in an outer edge flange 24. Projecting downward, inwardly of the flange 24 and into the mounting cup $c$, is a hollow cylindrical spacing cuff 25.

Figure 3:
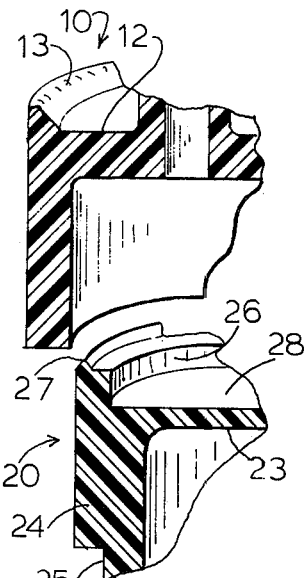
FIG. 3 is a further enlarged fragmentary view of the portions at the left side of FIG. 2 shown prior to joining by sonic welding.

Upwardly of the flange 24 and projecting upward beyond the upper surface 28 of the circular body portion 23 is a perimetral joining wall 26 whose upper edge is designated 27. To permit joining by the sonic welding process, the upper edge 27 is originally formed as a double bevel projection as seen in the enlarged view FIG. 3.

Figure 4:
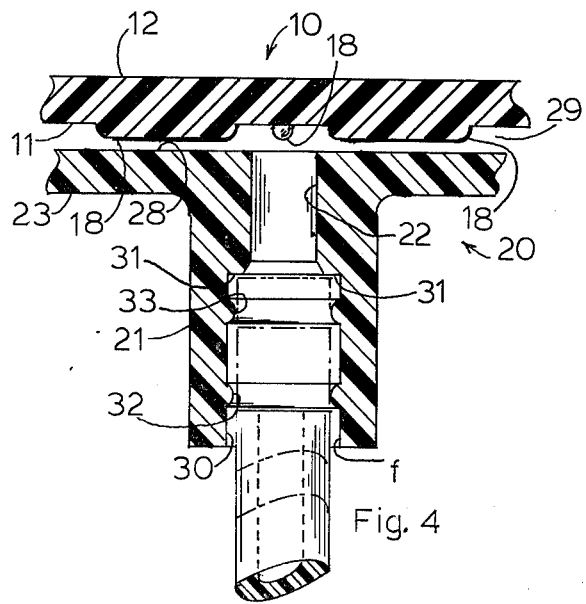
FIG. 4 is a similarly enlarged fragmentary view of the center portion of FIG. 2, showing the stem of the dispensing valve in successive positions during the mounting of the dispensing head thereon.

The inlet of 21 of the lower member 20 is shown in detail in FIG. 4. A bore 22, extending downward from the upper surface 28 joins, near the mid-point of the inlet hub 21, an enlarged counterbore 30 at a juncture which is in effect a downward facing seating surface 31. Within the counterbore 30 is a first, or lower, annular inward projecting resilient bead 32, spaced substantially below the seating surface 31; the inner diameter of this bead is such as to provide an easy clinging preliminary fit onto the outer diameter of the reciprocable tubular stem $f$. In FIG. 4 the position of the stem $f$ within the counterbore 30, as so preliminarily fitted, is shown in the single dotted lines. The counterbore 30 also has a second inward projecting resilient bead 33 positioned nearer to the seating surface 31, and having an inner diameter small enough to seal against the stem $f$. Thus a greater force is required to push the head onto the tubular stem $f$ to the position shown in FIG. 4 in the double dotted lines. In this position, which is the position for dispensing, the tip of this stem $f$ seats against the seating surface 31.

The upper member 10, best seen in FIGS. 1 and 2, is its nozzle-bearing portion. It is generally circular in plan form and is molded of a fairly rigid plastic. It includes an upper circular pressing surface 12 surrounded by an upward and outward tapering continuous rim 13. On its under side below the pressing surface 12, it has a lower circular surface 11 whose diameter is sufficient to cover the upward projecting joining wall 26 of the lower member 20. Radially outward thereof the upper member 10 terminates in a downward outer flange 19 which on assembly fits about the flange 24 of the lower member 20.

When the parts are fitted together as shown in FIG. 2, and pressure applied and sonic welding apparatus utilized, a continuous seal is formed between the upper and lower members 10 and 20. In this conventional process the double bevel projection 27 is compressed and effectively removed from the upper edge of the joining wall 26. The welded seam so formed is a sanitary seal substantially free of voids. The space between the inner surface 11 of the upper nozzle-bearing portion 10 and the upper surface 28 of the lower member 20 so joined to it forms a flushable distribution chamber 29.

Referring again to the upper member 10, as seen in FIG. 1, four prong-like nozzles project perpendicularly from the pressing surface 12, their bores being parallel to the bore 22 of the lower member 20. These integral nozzles 14 have pointingly tapered tips 15, best seen in FIG. 2, and cylindrical lower portions 16. The parallel bores 17 of the nozzles 14 extend inward to the innersurface 11 of the member 10 so as to communicate flow from the distribution chamber 29.

In order to avoid unnecessary thickness of that portion of the upper member 10 between its outer and inner surfaces 12, 11, and yet assure that inward deflection of this portion will not shut off flow from the bore 22, special provisions are made. As best shown in FIG. 2, the lower surface 11 of the nozzle-bearing member 10 has four radially-extending ribs 18 commencing outward from the bore 22 and extending radially to points inward of the nozzle bore 17. If great pressure should be applied to the upper surface 12, so as to deflect it inward, the ribs 18 will come into contact with the upper surface 28 of the lower member 20, thereby maintaining a minimum height within the distribution chamber 29 adequate to permit continued flow through the bore 22, through the distribution chamber 29 and to the nozzle bores 17.

If a relatively thin piece of meat is to be impregnated, a spacer disk generally designated 40, which has nozzle-receiving bores 41 as in FIG. 1, may be applied over the nozzles 14 to prevent them from penetrating too deeply into the meat. The upper surface 42 of the spacer disk 40 is formed similar to the upper surface of the upper member 10, and has a similar continuous perimetral rim 43. The lower surface 44 of the spacer disk 40 may be cut out to save material, and for this purpose it may utilize for support an annular downward projection 46. About the outer edge of the lower surface 44 is an upward sloping bevel 47, to fit over the sloping rim 13 of the upper member 10.

In use, the dispenser with the head mounted thereon is inverted and the nozzles 14 pressed into the meat until the projecting rim 13 contacts the meat. Further pressure causes the tapering rim to squeeze the meat radially inward, (or at a minimum to resist outward spread) as the pressure exerted by the upper surface 12 tends to spread the meat. The meat, yielding in response to these pressures, seals securely against the sides of the nozzles 14. Further pressure, sufficient to overcome the preload of the valve spring $e$, opens the valve $d$, permitting the contents of the bag $i$ to flow through the valve stem $f$ into the distribution chamber 29 and outwardly through the bores 17 of the nozzles 14. Since the pressure, so exerted by the pressing surface 12 in cooperation with the rim 13, holds the yielding meat firmly against the sides of the nozzles 14, the liquid contents of the bag $i$ do not escape around the nozzles 14 but permeate the meat under pressure.

After such use, the user may remove the dispensing head from the valve stem $f$ and flush it by flowing water through the bore 22, the distribution chamber 29 and the nozzle bores 17. Adequate flushing is assured by the cylindrical distribution chamber 29, whose openness is not substantially impaired by the radial ribs 18; similarly sanitary is the continuous void-free sonic welded seal at the perimetral wall 26. Having so flushed the dispensing head, the user may replace it onto the valve stem $f$, pushing the head downward past the first bead 32 into the single dotted line position shown in FIG. 4. The second bead 33 may strike the stem $f$ with sufficient force to make a clicking sound, all without overcoming the preload on the valve spring $e$. The clinging fit afforded by the bead 32 is sufficient to permit the dispenser head thereon to be inverted for a subsequent meat-impregnating operation. At that time, when the dispensing head is pressed into the meat to open the valve, the valve stem $b$ is driven past the second bead 33 against the seating surface 31; and is then held sealed by the bead 33 as the impregnating operation preceeds.

Figure 5:
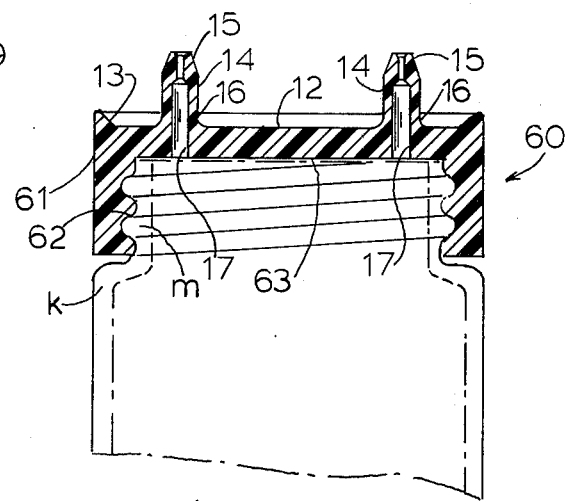
FIG. 5 is an alternate embodiment of the present invention, shown in section, mounted on a conventional squeeze bottle shown fragmentarily in phantom lines.

An alternate embodiment of the present invention, adapted for use on squeeze bottles which may contain a meat impregnating liquid, is shown in FIG. 5. In that figure, portions corresponding precisely to those of the embodiment of FIGS. 1-4 bear the same numbers, and will not be described in detail.

A conventional resilient plastic squeeze bottle generally designated $k$ and shown fragmentarily in phantom lines, has an outwardly threaded neck portion $m$. On it is mounted a dispensing head generally designated 60 having a cylindrical mounting portion 61 whose internal threads 62 fit with the external threads $m$ on the squeeze bottle $k$.

The squeeze bottle dispensing head 60 has a lower circular surface 63, from which extend upwardly the bores 17 of nozzles 14 which project from its upper surface 12, this surface being rimmed by a tapering perimetral rim 13 as in the prior embodiment. The nozzles 14 have tapering prong-like tips 15 and cylindrical body portions 16, as in the prior embodiment.

In use, the squeeze bottle k containing the liquid to be impregnated is capped by the dispensing head 60. The assembly is inverted and pressed into the meat, with the upper surface 12 squeezing the meat outwardly and the rim 13 confining it and tending to squeeze it inwardly about the cylindrical portions 16 of the nozzles 14. Superatmospheric pressure is applied to the liquid by squeezing the bottle, forcing the liquid into the meat in the same manner as in the heretofore described embodiment. The dispensing head 60 may be readily removed for flushing and replacement.

The rim 13 so cooperates with the upper surface 12 that the precise configuration shown may be departed from. Thus these functions would be served if, instead of using a bevel rim at an edge of a planar surface, the entire surface was saucer shaped or concave.

Further modifications in details of size and arrangement of the members will suggest themselves. For example, the number of nozzles utilized and the size and proportion of the dispensing heads are obvious matters of choice.

The present invention includes an improved method for permeating the meat with a liquid. It comprises the steps of penetrating the surface of the meat, along a plurality of parallel axes, with parallel spaced-apart prong-nozzles, whereby to form apertures, then while maintaining such nozzles within such apertures, pressing a rimmed surface against the entire outer surface of the meat between them, thereby causing the meat to spread against such nozzles and hold such apertures sealed, and while so holding such apertures sealed, discharging liquid under superatmospheric pressure through such nozzles into the meat.

The invention also presents a new use for a dispenser having a valve of the spring-closed type whose outlet is a tubular stem, and a dispensing head mounted thereon having a plurality of prong-like outlet nozzles on parallel axes projecting perpendicularly from a rimmed surface extending over the entire area between such nozzles. The steps of this new use are as follows: inverting the dispenser, presenting its dispensing head against the meat, penetrating the surface of the meat with such prong-like nozzles, whereby to form apertures, pressing the dispenser to force such rimmed surface against the outer surface of the meat between such nozzles, thereby causing the meat, confined by the rim of such surface, to press about the side surfaces of such nozzles and hold such apertures substantially sealed against leakage, and so depressing said container against the resistance at the meat surface as to displace the head, thereby to open the valve and discharge liquid under such gas pressure through such nozzles into the meat.

We claim:

1. For impregnating meat with a liquid under superatmospheric pressure, a dispensing head comprising
   a nozzle-bearing member having
   an outer pressing surface portion having a perimetrical edge,
   an inner surface,
   a plurality of rigid tapered prong-like nozzles located spacedly along said pressing surface portion and inwardly of its said edge, said nozzles having rounded outer wall portions adjoining said outer pressing surface portion,
   said prong-like nozzles having parallel bores extending from said inner surface to nozzle tips, and
   a second member having an upper surface and
   an inlet hub including a bore leading to said upper surface,
   one of said nozzle-bearing member and said second member having a perimetrical wall extending to the other member, and a continuous seal thereat between said two members,
   whereby to provide within said dispensing head a chamber of which said outer pressing surface is the upper outer wall, which on being pressed against meat, into which said nozzles have penetrated, with sufficient force to compress such meat, causes the meat to seal against the outer wall portions of said nozzles.

2. For impregnating meat with a liquid under superatmospheric pressure, a dispensing head comprising
   a nozzle-bearing member having
   an outer pressing surface portion and
   a continuous rim extending slopingly upward and outward about said outer pressing surface portion, and
   a plurality of rigid tapered prong-like nozzles having rounded outer wall portions adjoining said outer pressing surface portion,
   whereby when said dispensing head is mounted on a dispenser adapted to dispense a liquid under superatmospheric pressure and said dispenser is inverted and said nozzles penetrate into such meat and said pressing surface presses thereagainst sufficiently to spread such meat, said rim squeezes radially inward against the spread of such meat and aids in sealing the meat against said outer wall portions of said nozzles.

3. A dispensing head as defined in claim 2, wherein said nozzle-bearing member has means for mounting a squeeze bottle,
   whereby, on squeezing same, super-atmospheric pressure may be applied to liquid therein to discharge same under such pressure and thereby impregnate such meat.

4. The dispensing head as defined in claim 2, said nozzle-bearing member further having an inner surface, together with,
   a second member having an upper surface,
   a lower inlet hub including an inlet bore through said surface
   one of said nozzle-bearing member and said second member having a perimetrical wall, and a continuous seal thereat between said two members,
   whereby to space the upper surface of the second member out of contact with the said inner surface of said nozzle-bearing member and thereby provide within such dispensing head a chamber which is readily flushed from the inlet hub to and through the nozzles.

5. For use with a dispensing container including a valve of the type having reciprocal tubular stem and a preloaded spring to urge it upward to a closed position,
   a dispensing head comprising
   a nozzle-bearing member having
   an outer pressing surface portion, and
   a plurality of tapered prong-like nozzles projecting integrally outward from said outer pressing surface portion,
   a second member having an upper surface and
   an inlet hub including a bore leading to said upper surface, one of said nozzle-bearing member and said second member having a perimetrical wall, and a continuous seal thereat between said two members,
said inlet bore of said inlet hub further having
a counter-bore extending to a downward facing seating surface,
said counter-bore having an annular inward projecting bead spaced from said seating surface and whose ucompressed inner diameter is such as to cling to such valve stem with lesser resistance to downward movement than that force required to overcome the preload of such spring,
whereby said dispensing head may be placed clingingly on such valve stem without causing such valve to open.

6. A dispensing head as defined in claim 5,
said counter-bore having a second resilient bead positioned between said first defined bead and the said seating surface at the juncture of said bore and counter-bore,
said second bead having an inner diameter sufficiently smaller than said first bead to seal against such valve stem when, after inverting such dispensing container, the dispensing head is pressed forcibly against the meat to be impregnated,
whereby to force the valve stem through said second bead to seat against said seating surface.

7. For impregnating meat with a liquid under superatmospheric pressure, a dispensing head comprising
a nozzle-bearing member having an upper pressing surface portion and
a plurality of tapered prong-like nozzles projecting integrally outward from said pressing surface portion, whereby they may penetrate into meat to be impregnated, and
a spacer disc separable from said nozzle-bearing member and having a plurality of bores spaced correspondingly to said nozzles and of such diameter that said nozzles may pass therethrough, said spacer disc further having
an upper pressing surface formed similar to that of said nozzle-bearing member, there being
means, so interfitting said spacer disc and said nozzle-bearing member, as to fix an optional lesser depth of penetration into the meat so to be impregnated,
whereby to adapt the dispenser head to impregnate relatively thin pieces of meat.

8. A dispensing head as defined in claim 7, wherein said outer pressing surface portion of said spacer disc has
a continuous upwardly extending rim about said upper pressing surface portion,
whereby when said dispensing head is mounted on a dispenser adapted to dispense the liquid under superatmospheric pressure and said nozzles penetrate into such meat and said pressing surface presses thereagainst sufficiently to spread such meat, said rim exerts inward resistance against the spread of such meat and aids in sealing the meat seals against said outer wall portions of said nozzles.

9. For impregnating meat with a liquid under superatmospheric pressure, dispensing head comprising
a nozzle-bearing member having an outer pressing surface portion and having
a plurality of prong-like nozzles projecting outwardly therefrom, further having
an inner surface, that part of said nozzle-bearing member defined by said pressing surface portion and said inner surface being flexible under such pressures as may result when the dispensing head is pressed against the meat, together with
a second member having an upper surface and
an inlet hub including a bore leading to said upper surface,
one of said nozzle-bearing member and said second member having a perimetrical wall extending to the other member, there being a continuous seal thereat between said two members,
one of said nozzle-bearing member and said second member having spacer means spaced radially outward from said bore and projecting toward the other member a distance less than the height of said wall,
whereby on inward deflection under such pressure, to prevent shutting off of the flow of liquid out of the bore.

10. The dispensing head as defined in claim 9 wherein said spacer means comprises
a plurality of radially extending ribs commencing outward of said central bore and terminating inward of said nozzle,
the said ribs being formed on one of said nozzle-bearing member inner surface and said nozzle second member upper surface.

* * * * *